US012615212B1

(12) United States Patent
Martz et al.

(10) Patent No.: US 12,615,212 B1
(45) Date of Patent: Apr. 28, 2026

(54) SYSTEM AND METHOD FOR OFFLINE PROCESSING OF NETWORK TRANSACTIONS IN LIMITED CONNECTIVITY ENVIRONMENTS

(71) Applicant: Shift4 Technology Limited, Valletta (MT)

(72) Inventors: Matthew Martz, Las Vegas, NV (US); Shmuel Ur, Shorashim (IL)

(73) Assignee: Shift4 Technology Limited, Valletta (MT)

( * ) Notice: Subject to any disclaimer, the term of this patent is extended or adjusted under 35 U.S.C. 154(b) by 0 days.

(21) Appl. No.: 19/318,099

(22) Filed: Sep. 3, 2025

(51) Int. Cl.
*H04L 47/24* (2022.01)
*H04L 43/0811* (2022.01)

(52) U.S. Cl.
CPC .......... *H04L 47/24* (2013.01); *H04L 43/0811* (2013.01)

(58) Field of Classification Search
CPC ............................. H04L 47/24; H04L 43/0811
See application file for complete search history.

(56) References Cited

U.S. PATENT DOCUMENTS

| | | | |
|---|---|---|---|
| 6,411,946 B1 | 6/2002 | Chaudhuri | |
| 9,832,126 B1 | 11/2017 | Davis | |
| 2003/0214534 A1* | 11/2003 | Uemura | G06Q 10/109 715/805 |
| 2005/0246658 A1* | 11/2005 | Uemura | G06Q 10/109 709/206 |

| | | | |
|---|---|---|---|
| 2007/0265025 A1* | 11/2007 | Commarford | H04W 28/14 455/517 |
| 2008/0077672 A1* | 3/2008 | Knight | H04L 51/234 709/206 |
| 2010/0118892 A1* | 5/2010 | Nguyen | H04W 88/02 370/474 |
| 2015/0244775 A1* | 8/2015 | Vibhor | G06F 11/0772 709/203 |
| 2016/0359740 A1 | 12/2016 | Parandehgheibi et al. | |

(Continued)

OTHER PUBLICATIONS

Business Insights, "Credit Card Offline Processing: How Does It Work", Aug. 7, 2024 https://wallester.com/blog/business-insights/offline-credit-card-processing.

(Continued)

*Primary Examiner* — Jael M Ulysse
(74) *Attorney, Agent, or Firm* — PEARL COHEN ZEDEK LATZER BARATZ LLP

(57) ABSTRACT

A system and method for offline processing of network transmissions, including: receiving, without access to a communication network, an update to a schedule of transmitting data items over the communication network, where the schedule is determined based on a plurality of urgency levels and where each data item is associated with an urgency level; and transmitting—or preventing transmission of—data items over the communication network based on the received update. Some embodiments may be used for managing data transaction processes in environments where network connectivity may be intermittent or unreliable, where the communication network may have a data transfer rate below a predetermined threshold. Some embodiments may calculate a effectiveness metric for data items—and transmit, prevent transmission, or update the transmission/processing schedule for data items based on the calculated effectiveness metric.

15 Claims, 6 Drawing Sheets

(56)                   References Cited

U.S. PATENT DOCUMENTS

| 2018/0373801 A1* | 12/2018 | Nance | G06F 16/9574 |
| 2019/0340589 A1 | 11/2019 | Levy et al. | |
| 2019/0342203 A1 | 11/2019 | Selfin et al. | |
| 2020/0045131 A1 | 2/2020 | Nigam et al. | |
| 2020/0159783 A1* | 5/2020 | Shlyunkin | G06F 16/951 |
| 2022/0067046 A1 | 3/2022 | Katroulis | |
| 2022/0070258 A1* | 3/2022 | Klose | H04L 51/18 |
| 2022/0368778 A1* | 11/2022 | Worner | H04L 67/60 |
| 2023/0131149 A1* | 4/2023 | Xu | H04L 41/147 |
| | | | 370/310 |
| 2024/0007371 A1* | 1/2024 | Jin | H04L 43/0811 |
| 2024/0283709 A1* | 8/2024 | Syed Muhammad | H04L 41/16 |
| 2024/0406056 A1* | 12/2024 | Sarath | H04L 67/141 |
| 2024/0414562 A1* | 12/2024 | Kotaru | H04W 24/02 |
| 2025/0008493 A1* | 1/2025 | Wei | H04W 72/566 |
| 2025/0080636 A1* | 3/2025 | Kumar | H04M 1/72406 |
| 2025/0247354 A1* | 7/2025 | Tanzini | H04L 51/224 |

OTHER PUBLICATIONS datacapsystems.com, "Myths and Truths about Offline Payment Processing," Dec. 22, 2021 https://datacapsystems.com/blog/myths-and-truths-about-offline-payment-processing.

* cited by examiner

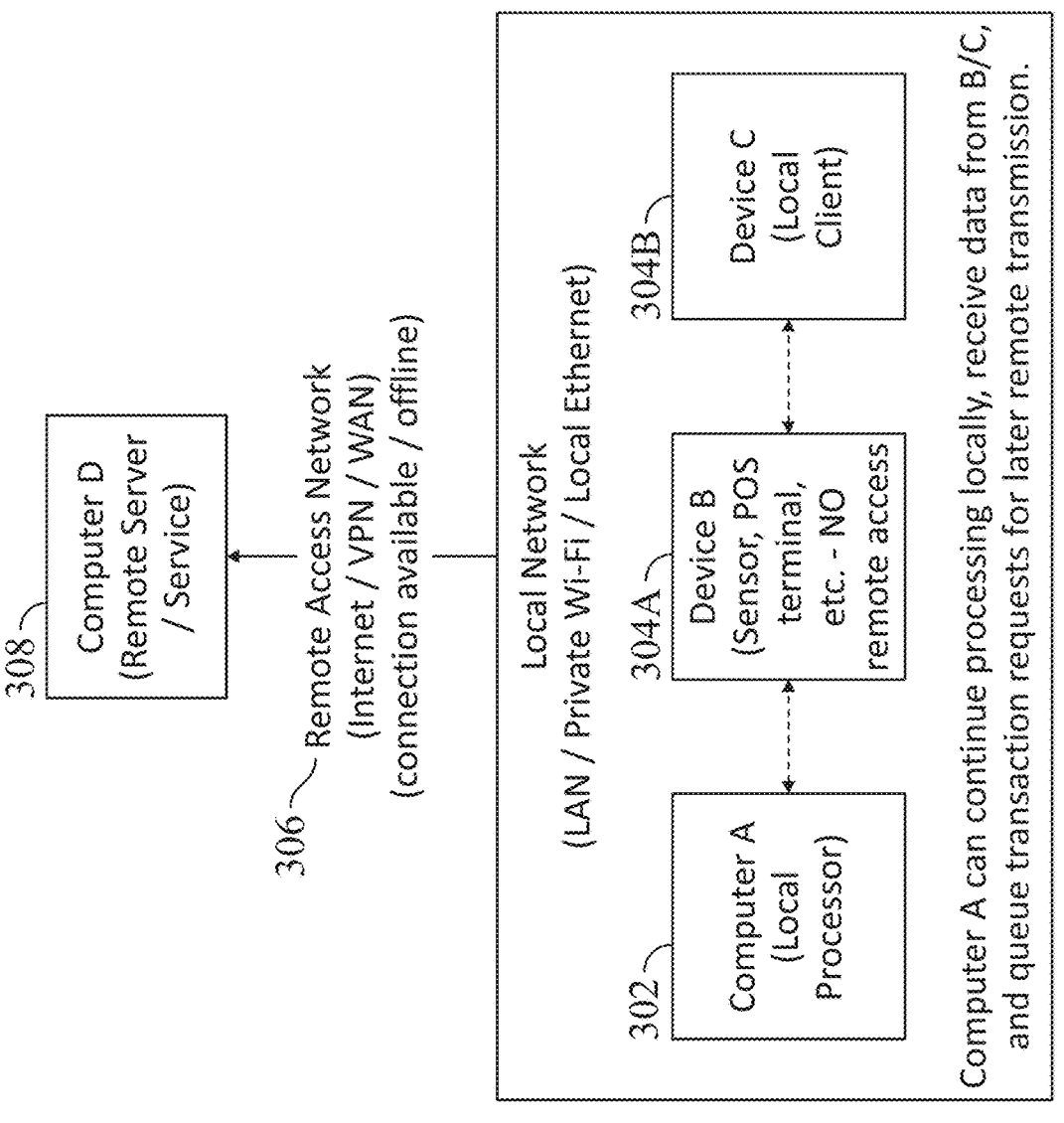

308 — Computer D (Remote Server / Service)

306 — Remote Access Network (Internet / VPN / WAN) (connection available / offline)

Local Network (LAN / Private Wi-Fi / Local Ethernet)

302 — Computer A (Local Processor)

304A — Device B (Sensor, POS terminal, etc. - NO remote access)

304B — Device C (Local Client)

Computer A can continue processing locally, receive data from B/C, and queue transaction requests for later remote transmission.

FIG. 3

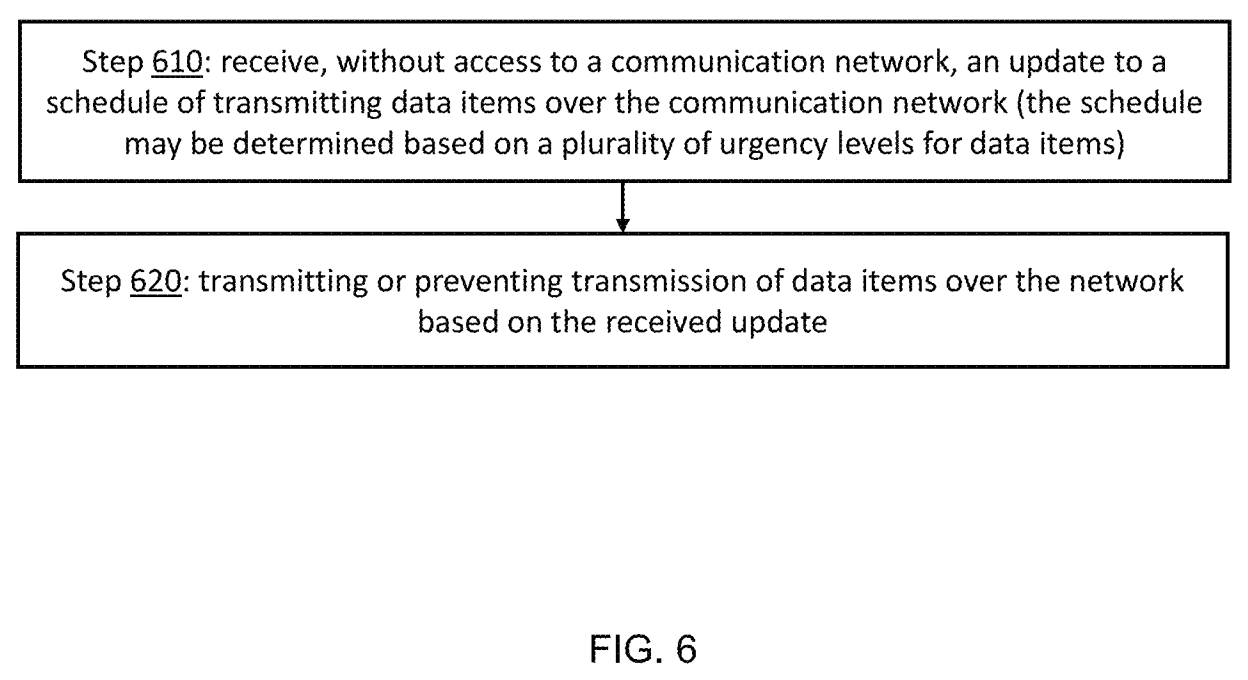

Step 610: receive, without access to a communication network, an update to a schedule of transmitting data items over the communication network (the schedule may be determined based on a plurality of urgency levels for data items)

Step 620: transmitting or preventing transmission of data items over the network based on the received update

FIG. 6

SYSTEM AND METHOD FOR OFFLINE PROCESSING OF NETWORK TRANSACTIONS IN LIMITED CONNECTIVITY ENVIRONMENTS

FIELD OF THE INVENTION

The present invention relates generally to managing challenges associated with limited or intermittent network availability, and more specifically to offline processing of network transactions.

BACKGROUND OF THE INVENTION

In modern networked systems, consistent and reliable connectivity has become a foundational expectation for the transmission and processing of transaction requests across various industries. However, communication networks are subject to unavoidable limitations, including network latency, intermittent availability, signal degradation, or complete service interruptions. These disruptions can impair the real-time processing of network transactions, causing delays, operational inefficiencies, and degraded user experiences. In environments where timely transaction handling is critical—such as, e.g., industrial monitoring networks, distributed data collection infrastructures (such as for example distributed health systems), and retail point-of-sale systems—the inability to process transactions during connectivity outages presents significant operational challenges.

While conventional systems rely on continuous network availability to transmit transaction requests to remote processing systems, these approaches leave transaction handling vulnerable to network instabilities. To address this issue, there exists a need for systems and methods capable of enabling offline processing of network transactions. Such solutions would allow data items, including transaction requests, to be locally captured, securely stored, and conditionally processed in the absence of an active network connection. The ability to queue, manage, and later transmit these transactions when connectivity resumes may help ensure operational continuity, data integrity, and service availability, even in environments where reliable communication infrastructure may not be guaranteed at all times.

SUMMARY

Some embodiments may provide systems and methods for offline processing of network transmissions. Some embodiments may receive, without access to a communication network, an update or adjustment to a schedule of processing and/or transmitting of data items over the communication network. The schedule may be determined based on a plurality of urgency levels, where each data item is associated with an urgency level. Some embodiments may transmit, or prevent transmission of, one or more data items over the communication network based on the received update.

In some embodiments, an effectiveness metric may be calculated for each data item, and the system may transmit, prevent transmission, or modify the schedule for data items based on the calculated effectiveness metric. According to some embodiments, an effectiveness metric may include a probability of successful transmission and/or of processing results.

Some embodiments may be used for managing data transmission processes in environments where network connectivity is intermittent, unavailable, or where the communinication network has a data transfer rate below a predetermined threshold (e.g., less than 100 kilobits per second (kbps)). Some embodiments may allow prioritization and scheduling of transmissions to optimize the use of limited or unreliable network resources while ensuring that higher-priority data items are transmitted and/or processed when network conditions permit.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 3 shows an example system including computer systems connected over a local network and a remote access network according to some embodiments of the invention;

FIG. 6 is a flowchart of an example process for offline processing of network transmissions according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments may perform offline processing of data items and/or optimize transmissions/communications of data items over a remote access network by receiving or determining, without access to the network (e.g., in "offline mode"), updates or adjustments to a transmission or processing schedule of data items. Data items may be transmitted or withheld over the network according to the updated/adjusted schedule, e.g., once (or in response to) a connection becomes available/stable. Some embodiments may determine effectiveness metrics to prioritize or adjust the scheduling of data transmissions for improved network efficiency and timely processing, e.g., of transmitted items, e.g., in environments with intermittent or low-bandwidth connectivity.

Figure 1:
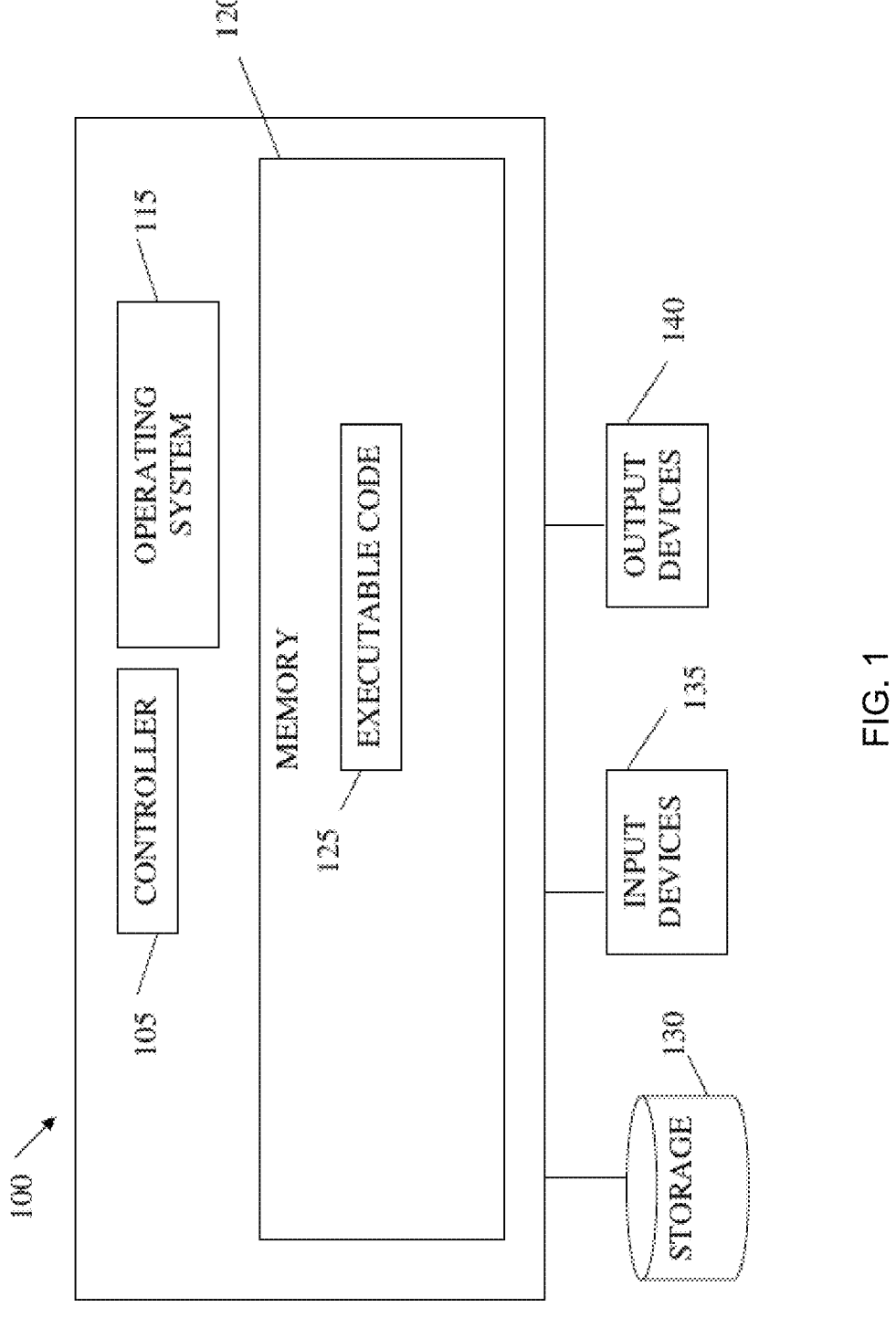
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

As used herein, a network transaction or data transfer may refer to a transmission or communication of data items that may be, e.g., encapsulated within one or more network packets, over a data or communication network from a source device to a destination device for processing, acknowledgment, or storage. In some embodiments, transaction requests may refer to data items containing operational information to be further processed as part of a computerized task. Transaction/network requests or simply "requests" may be managed, processed, and transmitted over a communication network to one or more destination computer systems or servers for further handling or processing. According to some embodiments, requests or other data items may include, but are not limited to, transaction identifiers, authentication credentials, timestamps (e.g., or receipt and/or transmission), an urgency level, and operational parameters required to complete the intended transaction. The communication network may be a remote access network and may comprise any wired, wireless, or hybrid infrastructure capable of transporting digital information between devices. Nonlimiting examples of communication networks and protocols that may be used in some embodiments may include, e.g., the internet, intranets, Wi-Fi, Ethernet, LTE, 5G, TCP/IP, UDP, and HTTP. A network may include a combination of networks, e.g. a WiFi network providing access to the internet which locally connects to an intranet. Additional or alternative networks and protocols may be used in different embodiments.

Figure 2:
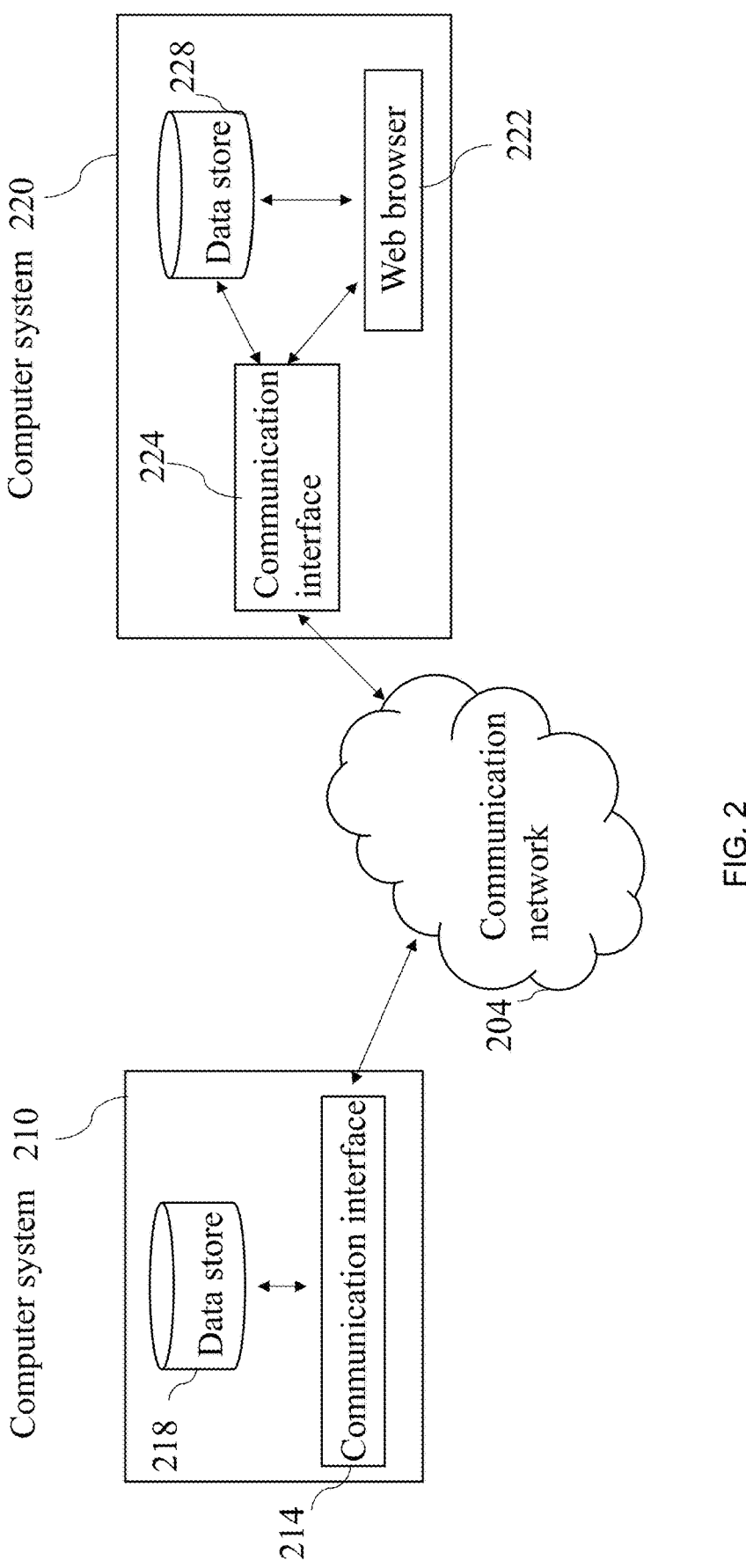
FIG. 2 shows example computer systems remotely connected by a data network according to some embodiments of the invention.

FIG. 2 shows example computer systems remotely connected by a data network according to some embodiments of the invention.

Some embodiments of the invention may include performing an exchange of data or data transfer between remotely connected computer devices, or over a remote access network connection. For example, remote computer 210 may send or transmit, over communication or data network 204 (e.g. the internet, an intranet, a WiFi network, etc., or a combination of networks), computerized data items, data elements, or data points of information (such as for example transaction requests)—to computerized system 220, and/or vice versa (for example based on a schedule of transmission or an update/adjustment to such a schedule). Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

Nonlimiting examples for exchanges of data according to some embodiments may include for example computer system 210 transmitting computer system 220 transaction details for online processing, computer system 220 transmitting computer system 210 a confirmation or approval that a transaction has been processed, and the like.

In some embodiments of the invention, computer systems 210 and 220 may communicate via a remote access data or communication or data network 204 via appropriate communication interfaces 214 and 224, respectively—which may be for example NICs or network adapters as known in the art. Computerized systems 210 and/or 220 may include data stores such as, e.g., 218 and 228 which may for example include a plurality of received data items, messages, requests, reports, and the like, such as for example described herein.

Computer system 210 not having access to computer system 220 via a remote access network, or not having access to the network, may refer to a state in which the expected communication link between the two systems— used for exchanging data, commands, or services over the remote access—is unavailable or disrupted, preventing computer system 210 from accessing resources, services, or control functions normally provided by computer system 220, or vice versa. Some embodiments may determine that a network is unavailable, or that a computer device or system does not have access to the network, by measuring the data transfer rate for data transmitted and/or received over that network, and comparing the measured rate to a predetermined threshold (such as for example a threshold T=100 kilobytes per second).

Some embodiments may be used for managing data transaction processes in environments where network connectivity may be intermittent or unreliable. In various embodiments, mechanisms are provided for maintaining operational continuity of transaction processing systems by temporarily storing transaction data locally during periods of network disruption and transmitting the stored data to external processing systems when connectivity is restored. As used herein, "local" may refer to operations, data storage, or processing performed on a computer device or system without relying on external network accessible resources or computers/systems reachable via a remote access network, whereas "online" refers to operations involving communication with remote systems or services over a remote access communication network.

As an illustrative nonlimiting example, computer system 210 may operate on a local network, providing access to nearby devices and services within the same physical environment (such as for example on board of an airplane). Computer system 220 may only be accessed by computer system 210 over a remote access network, enabling system 210 to communicate with it across different locations via wide-area or external networks such as the internet or a VPN, extending system 210's reach beyond its local infrastructure. When the remote access network is unavailable (e.g., during a flight), computer system 210 may not have access to computer system 220. Various different nonlimiting examples or use cases may be realized.

As used herein, a remote access network may refer to a telecommunications infrastructure enabling exchanges of data between computer systems placed in geographically disparate locations—for example via public networks, using protocols such as for example VPN (Virtual Private Network), SSH (Secure Shell), or RDP (Remote Desktop Protocol). A remote access network may incorporate, for example, secure tunneling, authentication, and encryption mechanisms to maintain data integrity and confidentiality over untrusted channels like the internet. As used herein, a local network, or Local Area Network (LAN), may refer to a privately managed, geographically confined network infrastructure that interconnects computers, servers, and other devices within a limited area such as for example a home, office, or data center—for example using high-speed wired (Ethernet) or wireless (Wi-Fi) communication standards. LANs may offer low-latency, high-bandwidth communication and typically do not require encryption for internal traffic due to controlled physical and logical access.

Some nonlimiting example embodiments of the invention may relate to processing network transactions or requests in "offline mode"—which may refer to cases where, e.g., connection to a remote access network is limited (e.g., to a data transfer rate below a threshold) or unavailable. Some embodiments may receive or produce, without access to a remote access network (e.g., using a local network, and when remote connection is unavailable), an update to a schedule of transmitting data items over the remote access network, or to a schedule of processing data items by the remote server and/or local device. When connection to the remote access network becomes available—some embodiments may send or transmit and/or process the data items based on the received update, or according to the updated schedule. As long as remote access is unavailable, some embodiments may receive schedule updates (e.g., to the transmitting and/or processing of data items)—and, when applicable, process data items locally according to the updated schedule.

In some embodiments, data items may require a response from a remote server, the remote server connected to a local device over the communication network.

For example, in some embodiments, communication between a source/local device to a destination/remote device may occur in both directions, or in a two-sided manner: a local device (e.g., source device such as for example a point-of-sale (POS) terminal, sensor, etc.) may transmit data (such as for example a network request) to a remote server over a remote access network, which may process the received information/request and return a response to the local device. For example, a request to access a building may be transmitted by an edge device (which may be for example a mobile phone or computer system operated by a person wishing to access the building, or a sensor/authentication device receiving biometric information such as, e.g., fingerprint data at the entrance to the building), followed by an approval or denial from a security server (being, e.g., physically separate or found at a different geographic location from the edge device or sensor). Similarly, a monetary transaction may be sent from a POS device (e.g., as a network request), and an approval of a valid payment may be received in return (as a response to the request) from a payment processor or server. Additional or alternative nonlimiting examples or use cases may be realized.

Some embodiments may determine that the local processor/device does not have access to a communication network or to a remote connection, for example based on a data transfer rate for the relevant communication network below a predetermined threshold, where the threshold may be selected based on the operational constraints or capabilities of the network. For example, Table 1 illustrates several types of transmission protocols and systems commonly used in environments where the available data transfer rate is limited, or in environments with limited or intermittent network availability:

TABLE 1

| Name/Category | Example Use Case | Example Characteristics |
|---|---|---|
| Delay/Disruption Tolerant Networking (DTN) | Space communications, remote sensing, disaster response | Store-and-forward routing, bundle protocol, tolerates long delays |
| LoRaWAN (Long Range Wide Area Network) | Internet of Things (IOT) devices in remote or rural areas with low power, sparse coverage | Long range, low power, low data rate, small payloads |
| Mesh Networking (e.g., Zigbee, Thread) | Environments with weak infrastructure (disaster areas, industrial sites) | Devices relay data to one another, forming an ad-hoc mesh |

7

TABLE 1-continued

| Name/Category | Example Use Case | Example Characteristics |
|---|---|---|
| Iridium Short Burst Data (SBD) | Global M2M (machine-to-machine) messaging via satellite | Low data rate, high reliability via satellite uplinks |
| HF Radio Data Links (ALE, STANAG 5066) | Military, maritime, and remote communications | Uses high-frequency radio for text/data over long distances |
| Opportunistic Networking | Devices opportunistically transmit when a connection appears | Data may be cached until a link is available (such as, e.g., using data ferries) |

In some embodiments, a low data transfer rate may be defined as less than 100 kilobits per second (kbps), though other thresholds (e.g., 50 kbps, 10 kbps, or values tailored to a specific network type or application) may be used in different embodiments. Different systems and architectures may be used depending on factors such as data volume, power constraints, range, and connection reliability.

Some embodiments may determine that the processor does not have access to the communication network based on a data transfer rate for the communication network wherein the communication network has a data transfer rate below a predetermined threshold. For example, to detect that the data transfer rate for a connection to a remote access network is below a threshold T (e.g., of 100 kbps), some embodiments may probe the network connection by sending or transmitting known data volumes and measuring transfer times, or monitor throughput via transmission control protocol (TCP) stack metrics (such as for example acknowledged bytes per interval or congestion window size). In some embodiments throughput may be estimated at the application layer by tracking bytes sent/received over time (e.g., total number of 600 received kilobytes in a time interval of 1 minute may be used to provide an estimate of $600/60=10$ kbps$<T$). Some embodiments may infer capacity using the bandwidth-delay product or by monitoring application-specific performance. Additional or alternative techniques accounting for various network conditions such as, e.g., latency, packet loss, and asymmetry, with thresholds optionally adjusted based on detected network type, and the like, may be used in different embodiments.

When a communication network operates at a low data transfer rate, it may be necessary to implement a transmission or processing schedule to manage the timing and prioritization of data transmissions, and/or the processing of data items or request (e.g., by a local and/or remote device). Such a schedule may help ensure that higher-urgency or time-sensitive data items are transmitted and/or processed first, while lower-priority data can be delayed or deferred to optimize use of the limited available bandwidth and/or processing resources.

In some embodiments, offline mode may refer to a state (or to a set of computerized protocols and operations) where a computing device or system operates without access or without an active connection to a remote computer, or to a remote access network (or where the connection to that network, e.g., is unstable or has a data transfer rate lower than a threshold of X kilobytes per second), or independently from such access/connection. While in offline mode, the system may continue to perform local processing, receive data over a local network (for example from a computer system or device connected to the local network and not having access to remote systems, unable to take part in remote access communications, and the like), and/or store transaction requests and data items for later transmission when a remote access network connection becomes available. A state (or a set of computerized protocols and operations) in which a computing device or system operates with access or with an active connection to a remote access network may be referred to as online mode.

Some embodiments may generate, by the local device, a tentative response to the request, and replace the tentative response with the response from the remote server based on a determination that the tentative response does not match the response from the remote server.

For example, some embodiments may process requests or data items locally, e.g., when in offline mode. For example, when in offline mode, the system may approve or deny requests (such as, e.g., payments), perform a preliminary or tentative analyses on sensor data, and the like—by the local computer device and without using a remote access network. Local processing may be performed, e.g., according to predefined rules and while having only partial information, or while not performing a full analysis (as would have been performed, e.g., by the remote server).

Based on schedule updates or adjustments received in offline mode, some embodiments may produce or generate an initial/tentative response to a request locally (e.g., in offline mode), and send the request to a remote server when remote access connection is available. The remote server may produce another, second response (e.g., at a point in time subsequent to the outputting or generating of the locally produced, initial response) and some embodiments may determine if the initial or tentative response matches, or if it is consistent with the subsequent, remotely produced response.

For instance, when a connection to the remote access network is unavailable, the local device may generate a tentative response to a request using locally available information and predefined rules. When a remote response is later generated (once a remote access connection is reestablished), the local or remote device may compare specific response attributes of the two generated responses—such as, e.g., status codes, urgency or priority levels, or decision outcomes—to determine whether the tentative and remote responses match. If a difference is detected between the tentative and remote response, the local computer device may, for example, replace the tentative response by updating the associated data record, log entry, or response queue with the contents of the remote response. For example, a local industrial controller may generate a tentative response to sensor readings, classifying a temperature reading as "non-critical" based on offline thresholds; upon reconnecting, it may receive a response generated by the remote server marking the event as "critical". Upon comparing the two response data items and determining the responses do not match (as, e.g., urgency levels specified in the two response data items are not identical), the local device may replace the tentative response with the remote response by, e.g., triggering an overwrite of the local, tentative response or log entry—which may subsequently lead to an immediate or urgent processing or escalation of the relevant readings, and for example to automatically shut down the relevant systems to prevent damage by overheating. In some embodiments, responses or response data items may include data or metadata including, but not limited to, urgency levels (for example, in a similar manner to levels that may be included in requests according to some embodiments of the invention), and different responses generated by local or remote devices may be compared using, e.g., checksums and/or hash operations, and the like.

In some embodiments, urgency levels may be determined based on the tentative response generated by the local device. Using the same nonlimiting example, a local device may tentatively classify a sensor reading of 78° C. as "non-critical" with a "Low" urgency based on offline thresholds. (Upon later receiving a remote server response categorizing the same reading as "critical," the system may compare both responses and, based on the mismatch, update or adjust the urgency level to "High".) This may involve writing or updating associated data fields in a response data item (produced locally and/or remotely), such as for example overwriting data fields in a locally generated tentative response Tentative_Res={Event ID: 3021, Sensor Type: Temperature, Response: Non-Critical, Urgency: Low}, with ones from a remotely generated response: Remote_Res={Event ID: 3021, Sensor Type: Temperature, Response: Critical, Urgency: High}. Some embodiments may accordingly ensure that downstream components and/or processes handle the event with appropriate priority.

Additional or alternative transmission and/or processing flows may be used in different embodiments.

FIG. 3 shows an example system including computer systems connected over a local network and a remote access network according to some embodiments of the invention.

While in offline mode, computer system 302 may be connected to a local network, allowing it to perform local processing, receive/transmit data from/to nearby devices (such as sensors, terminals, or client devices 304A-B without remote access capability), and queue transaction requests or data items for later transmission when remote access network 306 becomes available and allows a connection to computer system 308 or other external systems. Additional or alternative components or connectivity between system components may be used in different embodiments.

Some embodiments may include a processing system configured to detect the availability or status of a network connection in real time. Upon detecting a loss or degradation of network connectivity, the system may automatically transition from an online mode of operation to an offline mode. In this offline mode, the system may continue to receive transaction-related data, including user inputs, device-generated metadata, or other operational parameters, and securely store such data in a local, non-volatile storage medium.

In certain embodiments, transaction requests or data processed in offline mode may be temporarily stored, e.g., in an encrypted format within a designated storage queue. The system may implement one or more security protocols to maintain the confidentiality and integrity of the locally stored data while preventing unauthorized access during offline storage. Additionally, policies may be established to control the volume of data retained, such as setting transaction limits per offline session or capping the cumulative value of stored transactions to mitigate potential operational risks. Offline processing of a transaction may be possible until network connection is available again and the transaction or transaction request is sent or transmitted online.

Upon restoration of network connectivity, the system may automatically initiate a data transmission and/or synchronization process. In some embodiments, this may include, for example, retrieving the cached requests or data from local storage, transmitting the data to external processing systems or remote servers, and receiving acknowledgment messages indicating, e.g., successful or failed processing outcomes. The system may further be configured to notify system operators or administrators of transaction statuses, enabling appropriate follow-up actions, such as addressing any declined or invalid transactions.

In some embodiments, one or more of data items may require a response from a remote server, the remote server connected to a local device over the communication network.

It is noted that responses to requests that may be generated and/or received by some embodiments may take various forms, including, but not limited to, acknowledgments. For example, the response could specify or determine a scheduled time for an event or computerized task (e.g., schedule further transmission or processing of sensor data based on, e.g., how "abnormal" the data is), grant permission to access a secure file, and the like. In one nonlimiting use case of a monetary transaction, a response (produced or generated either locally or remotely) may indicate whether the transaction was successful and whether a purchased item may be handed to the buyer (which may for example be reflected in a response data item or binary variable such as for example Res=[0] in case of a successful transaction or Res=[1] in a case of unsuccessful transaction; see other nonlimiting example responses herein). Producing responses to requests, and performing related computerized operations, may be performed remotely-however, in some embodiments certain computerized operations, such as for example generating or producing an initial, preliminary, or tentative response, may be performed locally (e.g., by processing the request locally, while in offline mode, and prior to transmitting the request over a remote access connection).

In some embodiments, restoration of network connectivity between, e.g., computer system 210 and computer system 220 may be detected for example by periodically attempting network operations such as sending heartbeat messages, pings, or small data requests over the remote access network and monitoring for successful responses and/or the resulting data transfer rate over the relevant remote access network. Upon receiving a valid reply or successfully establishing a network session (with, e.g., a data transfer rate above threshold T), some embodiments may determine or confirm that connectivity has been restored. Some embodiments may perform additional verification such as for example measuring response time, throughput, or session stability over a predetermined time period (e.g., a data transfer rate above T for a time period of 10 minutes) to ensure the connection is reliable. Additional or alternative operations and validations may be performed in different embodiments.

As a result of processing a transaction or transaction request, some embodiments may generate or output response data items (which may also be referred to simply as a "response"), indicating the outcome, status, or required follow-up action associated with that transaction. An example response may be, e.g., a data item including results of a medical analysis, a confirmation of the scheduling of an appointment, a receipt for an online payment, and the like—which may be received from or generated by, e.g., a server or a computerized system physically separate and remotely connected over a communication network to the computer sending the transaction request and/or by the local device or system storing the request. See additional example responses herein.

In some embodiments, a remote computerized system or server may refer to a computing device or server located at a separate physical location, to which transaction requests or data items are transmitted only when a connection to a remote access network is available. In some embodiments, the remote computer system may generate or may output and/or send or transmit responses to transaction requests or data items transmitted to it over a remote access network.

Some nonlimiting use case examples for a remote computer system or server may include, e.g., centralized servers of a cloud-based data processing platform, remote enterprise transaction management system, financial settlement service, centralized Internet of Things (IoT) data aggregation and analytics system, or a remote medical server that collects, stores, and analyzes patient monitoring data transmitted from distributed medical devices.

Although some nonlimiting embodiments are considered herein in the context of network transactions or data items relating to online payments or credit card usage, different embodiments may consider transactions unrelated to payment, finance, or human behavior. For example, a network transaction may involve the transmission or communication of sensor data from an industrial monitoring device to a remote server for equipment status reporting, predictive maintenance, or system diagnostics. Additional or alternative use cases may be considered by different embodiments.

Figure 4:
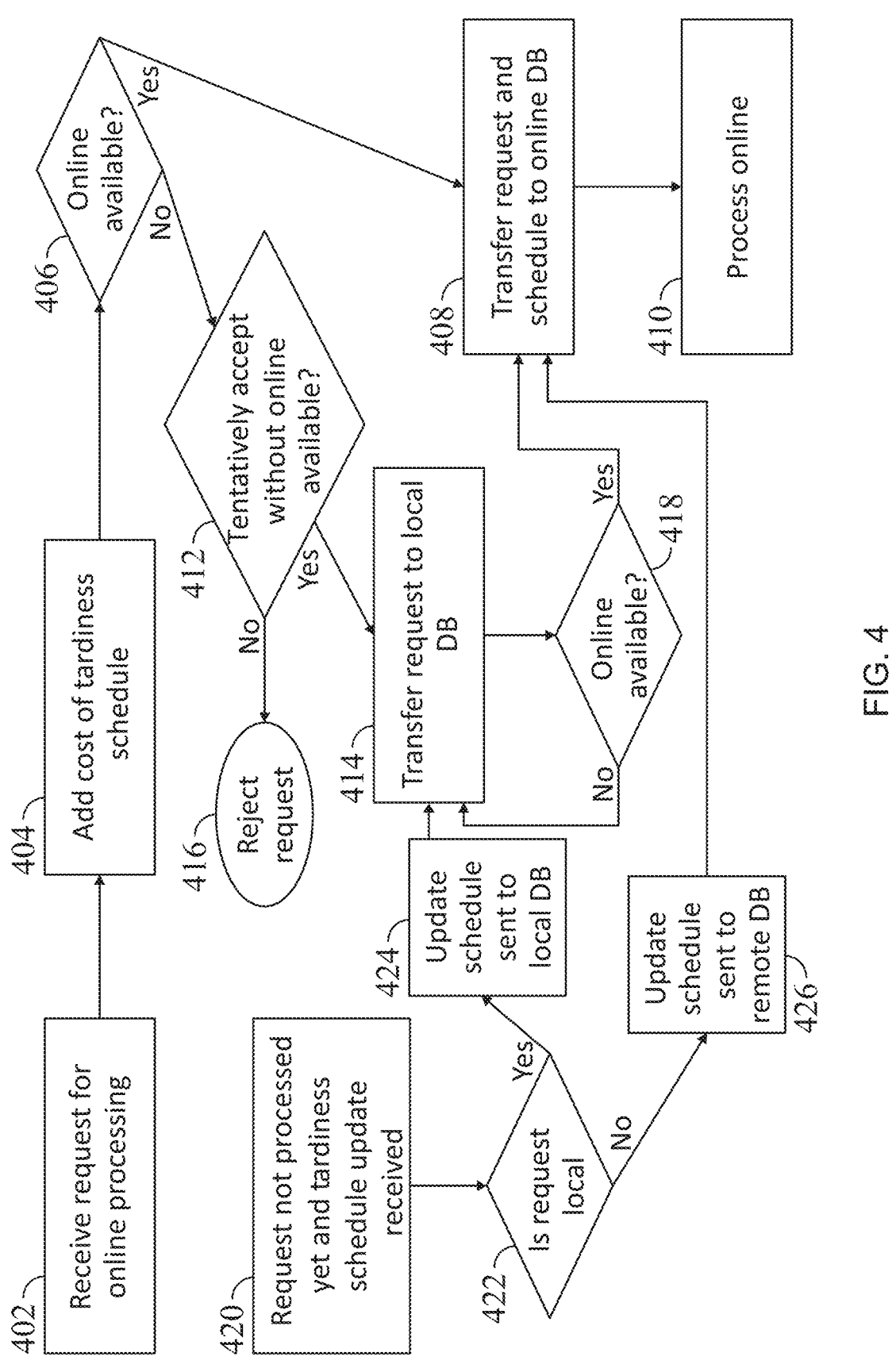
FIG. 4 is a flowchart depicting an example process offline processing of network transactions according to some embodiments of the invention.
Figure 5:
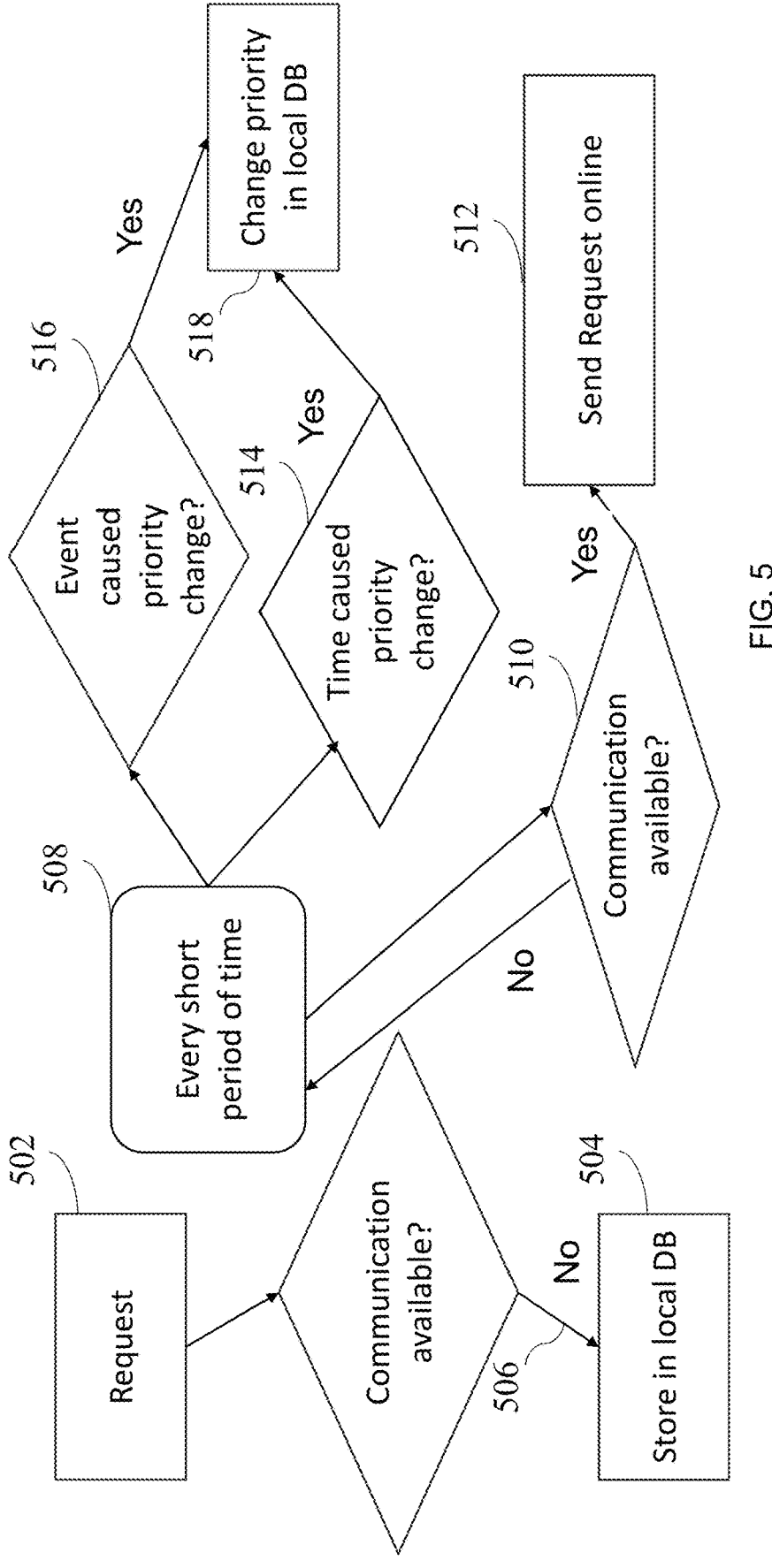
FIG. 5 shows an example process for storing data items and changing priorities in local storage according to some embodiments of the invention.

In some nonlimiting embodiments, the local transaction processing system or device may include an endpoint device—such as for example a point-of-service (POS) device, mobile terminal, or other networked computing platform equipped with offline transaction handling capabilities (see, e.g., FIGS. 3-5). The device may include a network interface module configured to monitor network status and a transaction management module configured to control data flow between online and offline modes. A storage module may securely cache transaction data during offline operation, while a synchronization module manages the orderly transmission of stored data once connectivity is restored.

To enhance operational resilience, some embodiments may incorporate configurable parameters, such as transaction size limits, data retention periods, and offline-specific approval criteria. For example, the system may approve certain transactions during offline periods based on historical approval data or predefined risk thresholds, thereby allowing continued transaction acceptance while mitigating exposure to operational errors.

Some embodiments may provide administrative interfaces enabling system operators to configure offline transaction settings, monitor offline transactions or data items, and receive alerts or reports regarding offline operational status. These interfaces may facilitate oversight and allow operators to respond proactively to conditions impacting connectivity or data synchronization.

Some embodiments may provide a technical solution for maintaining continuous data transaction capabilities in operational environments characterized by intermittent or unreliable network access. These embodiments may improve communication network technology by, e.g., reducing disruptions to digital workflows caused by limited network access, and by enhancing system resilience to network disruptions and changing connectivity conditions.

A transaction record expiration management module or component may also be included in some embodiments. This module may track the elapsed time since each offline transaction was captured, and may apply or enforce one or more expiration policies based on, e.g., predefined or predetermined conditions or criteria (which may be defined or configured, for example, by a system administrator or received from an endpoint server or a remote server to which transactions may be sent when an online connection is available). Transactions not submitted for processing within a defined expiration period may be invalidated, flagged for operator attention, or optionally purged from the system's offline queue to prevent the transmission or submission of stale or non-compliant transaction requests or records.

In addition to offline processing, some embodiments of the system may include a failover connectivity management component configured to maintain real-time transaction processing capability during network disruptions. This component may automatically transition the system's primary connection to a secondary communication channel, such as a cellular data service (e.g., 3G, 4G/LTE), wired backup, or alternative broadband network. In such implementations, transaction processing may continue in an online mode with uninterrupted authorization routing, thereby reducing reliance on offline transaction handling and minimizing associated risk.

Through the combination of configurable offline operation or processing, offline authentication, transaction expiration management, and dynamic failover connectivity, some embodiments may provide a comprehensive technical framework for managing network transactions, communications, transmissions, and processing allowing for operational continuity and resilience in fluctuating network conditions.

FIG. 4 is a flowchart depicting an example process offline processing of network transactions according to some embodiments of the invention.

In some embodiments, the process may begin with receiving a transaction or transaction request for online processing (element 402). The system may make automatic decisions and/or determine or calculate various quantities or metrics—such as, e.g., effectiveness metrics (see further description herein)—and associate an urgency level or cost of tardiness with the request (element 404), which may reflect a priority of processing the request as part of a tardiness or transmission/processing schedule.

Some embodiments may check whether an online connection is available (element 406). If the connection is available, the request and its associated schedule may be transferred to an online system or database (element 408) for online processing (element 410). If the connection is not available, the system may determine whether to tentatively process (e.g., accept, acknowledge, and the like) the request without online availability (element 412). If the decision is to process, the request may be transferred to and stored in a local database (element 414). Otherwise, the request or transaction may be rejected (element 416).

In cases where the request is transferred to a local database, the system may continue to monitor the availability of an online connection (element 418). Once connectivity is established or restored, the request/transaction may be transmitted or transferred to the online database (element 408) for processing (element 410).

Some embodiments of the invention may automatically reject or deny transactions or requests while offline, e.g., if they do not meet certain criteria—such as the cost of the tardiness (or the corresponding effectiveness values describing transmission at a given time t) being too high (or low) or if tentative acceptance, or if acceptance while in offline mode, is not possible or unfeasible.

Some embodiments of the invention may receive, without access to a communication network, an update to a schedule of transmitting data items over the communication network. In some embodiments, updates to the transmission or processing schedule and/or data items to be transmitted may be received when the processor does not have access to the communication network.

For example, a tardiness schedule update—or an update to the schedule of transmitting data items over the network—may be determined or received (element 420), e.g., while the system is still in offline mode, or if network connection or access to the network is unavailable. The system may determine whether a transaction or transaction request (including, for example, data to be processed and/or transmitted to an online system) for which an urgency level has been updated is local or has been retained locally, and if it has not yet been processed and/or sent or transmitted for online processing (element 422). If so, the request and/or schedule update may be sent to the local database (element 424); otherwise, request and/or the schedule update may be sent to a remote or online database (element 426) upon the restoration of a remote access network connection, e.g., to impact the scheduling or urgency of processing the transaction/request online. Additional or alternative operations or components may be used in different embodiments. (For example, upon restoration of a remote access network connection, an updated transaction request from a sensor indicating a critical fault condition may be sent to an online database to immediately adjust the processing schedule of an online diagnostic system, elevating its urgency for remote handling ahead of lower-priority transactions at the online system. See nonlimiting example use case relating to an industrial automation system provided herein.)

In some embodiments, regardless of whether a connection to a remote access network is available (it may be available, e.g., in limited capacity), data items or updates to a transmission/processing schedule may be received, for example, over a local network. A local network according to some embodiments may be a private, limited-range network that enables communication between nearby devices without requiring access to a wide-area or external communication network. Nonlimiting examples of local networks include wired Ethernet connections, Wi-Fi local area networks (LANs), Bluetooth connections, Zigbee networks, or near-field communication (NFC) links. Such local networks may allow systems or devices within a limited physical proximity to exchange data directly, without relying on remote servers, internet infrastructure, or public communication networks. In some embodiments, while a local network may be used to receive and temporarily store data items or schedule updates, the transmission of those data items to a remote destination may require a connection to a remote access network when such a connection becomes available.

In some embodiments, a tardiness schedule (also referred as a transmission or processing schedule) may refer to a set of rules or an ordered sequence that determines the timing and priority for processing and/or transmitting data items over a communication network.

For example, a tardiness schedule may be determined based on a plurality of urgency levels, where each data item to be transmitted may be associated with an urgency level. For example, Table 2 illustrates a nonlimiting data structure associating or linking data items (such as for example transaction requests, listed in their order of receipt) with their corresponding urgency levels, which may be used to determine a tardiness schedule, or an order transmission:

TABLE 2

| Data Item | Urgency Level | Time of Receipt (hour:minute) |
| --- | --- | --- |
| Data Item A | Low | 10:01 |
| Data Item B | High | 10:02 |

TABLE 2-continued

| Data Item | Urgency Level | Time of Receipt (hour:minute) |
| --- | --- | --- |
| Data Item C | Medium | 10:03 |
| Data Item D | High | 10:04 |
| Data Item E | Medium | 10:05 |

In some embodiments, data items having a higher urgency level are transmitted before data items having a lower urgency level. For example, data items may be sorted based on their associated urgency levels to determine a transmission schedule or order. Table 3, for example, shows an example schedule the data items of Table 2 determined based on, or arranged in an order of urgency level or transmission priority, where data items having a higher urgency level are scheduled for transmission before data items having a lower urgency level, and where within each urgency level, the data items received first are scheduled to be transmitted and/or processed before those received at a later time:

TABLE 3

| Transmission Order/Schedule | Data Item | Urgency Level | Time of Receipt (hour:minute) |
| --- | --- | --- | --- |
| 1 (transmit first) | Data Item B | High | 10:02 |
| 2 | Data Item D | High | 10:04 |
| 3 | Data Item C | Medium | 10:03 |
| 4 | Data Item E | Medium | 10:05 |
| 5 (transmit last) | Data Item A | Low | 10:01 |

Some embodiments may transmit, or prevent transmission of, one or more of the data items over the communication network based on the received update to a processing or transmission schedule. For example, the update may modify the urgency levels of certain data items or requests, and the system may selectively initiate or prevent the transmission of those items in accordance with the updated urgency levels.

For instance, at a point in time t1, data item A may be associated with a "Low" urgency level, which would result in its transmission being deferred until after the transmission of items assigned a "High" urgency level. At a later point t2, an update to the schedule may be received that reclassifies the urgency level of data item A to "High", prompting its expedited transmission ahead of lower-priority items (e.g., item A may be transmitted immediately once remote access network connection becomes available). Conversely, in another example, data item B may initially be assigned a "Medium" urgency level at t1, qualifying it for near-term transmission. However, upon receiving a schedule update at t2 that reassigns data item B to a "Low" urgency level, some embodiments may prevent its immediate transmission, deferring it until higher-priority data items have been processed or transmitted.

Some embodiments may accordingly reorder queued transmissions or processing jobs, canceling lower-priority requests, or expediting the delivery of critical data items to remote systems or devices. Additional or alternative operations may be performed by different embodiments based on updates received for schedules and/or urgency levels.

In some embodiments, a transmission/processing schedule and/or an update to the transmission/processing schedule may be represented as data structures that include a list of data items, with each item associated with an urgency level and a time of receipt. Urgency levels specified in the update to the schedule may replace or override the urgency levels in the schedule determined prior to the update. A nonlimiting example data structure representing an update to a transmission/processing schedule in JavaScript Object Notation (JSON) format is provided in Table 4:

TABLE 4

```
{
  "schedule_update_id": "update_20250523_001",
  "timestamp": "2025-05-23T10:10:00Z",
  "data_items": [
    {
      "data_item_id": "A",
      "urgency_level": "Low",
      "time received": "2025-05-23T10:01:00Z"   },
    {
      "data_item_id": "B",
      "urgency_level": "High",
      "time_received": "2025-05-23T10:02:00Z"
    },
    {
      "data_item_id": "C",
      "urgency_level": "Medium",
      "time_received": "2025-05-23T10:03:00Z"
    },
    {
      "data_item_id": "D",
      "urgency_level": "High",
      "time_received": "2025-05-23T10:04:00Z"
    },
    {
      "data_item_id": "E",
      "urgency_level": "Medium",
      "time_received": "2025-05-23T10:05:00Z"
    }
  ],
  "sorting_criteria": [
    "urgency_level (descending)",
    "time_received (ascending)"
  ],
  "transmission_order": ["B", "D", "C", "E", "A"]
}
```

Additional or alternative sorting criteria for determining a transmission order or schedule may be used in different embodiments.

In some embodiments, urgency levels may be included or be specified in the relevant transaction requests or data items to be transmitted. (In such manner, updates to schedules may be received with the data items to be processed or transmitted, e.g., when the processor does not have access to the communication network.) For example, a transaction request or data item to be transmitted may include a content component specifying the transaction's data or payload, and a scheduling component that indicates or associates scheduling-related attributes such as an urgency level and a time of receipt with the request/data structure. The scheduling component may be used to determine the order or priority for transmitting the associated data item over a communication network. A nonlimiting example JSON network transaction request or data item to be transmitted is provided in Table 5:

TABLE 5

```
{
  "data_item_id": "TXN_001",
  "content_component": {
    "transaction_type": "sensor_data_upload",
    "payload": {
      "temperature": {
        "value": 22.5,
        "unit": "Celsius"
```

TABLE 5-continued

```
      },
      "humidity": {
        "value": 55,
        "unit": "Percent"
      }
    }
  }, "scheduling_component": {
    "urgency_level": "High",
    "time_received": "2025-05-23T10:02:00Z"
  }
}
```

In other embodiments, urgency levels may not be included in data items or transaction requests to be transmitted and may be associated or linked with these data items using dedicated data structures (see, e.g., Table 3).

In some embodiments a transmission/processing queue, order, or schedule may specify specific times for transmission or processing—e.g., the first item in the queue/schedule may be transmitted or processed at time T1=10:00 AM Eastern Time, the second item may be transmitted or processed at time T2=10:05, and the like.

Additional or alternative data structures and formats may be used in different embodiments.

One nonlimiting example use case in which some embodiments may be used may relate to, e.g., an industrial automation system, where a controller may maintain an existing transmission/processing schedule for periodic status reports including data read from sensors (e.g., temperature, vibration, or pressure monitors) connected to the controller over a local network. The reports may then be sent to a centralized server over a remote access network. New sensor data received over the local network while the remote access network connection is unavailable may include updates to this local transmission/processing schedule—for example, raising the urgency of a future transmission of a newly generated report if a sensor detects an abnormal reading or reprioritizing certain data for earlier dispatch. For example, assume that by default, reports are transmitted and/or processed in a first-in, first-out (FIFO) order, with reports generated earlier scheduled for delivery to the server before those generated later. Even when several reports are pending and have not yet been transmitted to the server, the most recent report containing abnormal sensor readings may be prioritized for transmission ahead of earlier reports. Upon receipt of abnormal sensor readings (e.g., above a set of predefined thresholds), some embodiments may automatically update the transmission/processing schedule for the pending reports such that the most recent report is to be sent first once a remote access connection is established.

Schedule updates may be determined, received, or communicated locally. For instance, the sensor system and/or an intermediary device may automatically transmit an alert to the controller that the data received from the sensor exceed the relevant thresholds and is therefore abnormal, and is to be sent to the server as soon as possible. Additionally or alternatively, the controller may receive and process the latest sensor data (e.g., with respect to system thresholds) to determine an urgency level for that data. Some embodiments may then modify the queue of pending sensor transmissions based on urgency levels. When the remote access connection becomes available, the controller may transmit both the updated schedule and high-urgency data to the remote server or diagnostic system.

In this nonlimiting example, the transmission of sensor data/report from a local system to a remote server over a remote access network may be considered as a "transaction request" (namely, a request made to the server/diagnostic system to process the data and produce a response—such as, e.g., output or diagnostic, or an automated action, e.g., shut down malfunctioning computer systems, etc.). Transaction request data transmitted over a remote access network may include data and metadata, such as, e.g., a timestamp, and an urgency level. When online, or after transmission over the remote access network, transactions may be processed and validated by the server or diagnostic system, which may approve them by acknowledgment or reject them if invalid (e.g., due to stale data or format errors). While offline, the local system may perform validation operations against predefined rules, tentatively approving valid transactions for the outbound transmission queue and discarding or flagging invalid ones. Urgency levels and effectiveness metrics according to some embodiments may determine whether transactions are to be prioritized, e.g., for immediate transmission once connectivity is restored or deferred based on their relevance and likelihood of successful delivery.

An example effectiveness metric for this specific use case could be, for example, the predicted system failure probability within the next 10 minutes, calculated based on trends in recent sensor readings such as rising temperatures, abnormal vibration levels, or voltage fluctuations. If this probability exceeds a critical threshold (e.g., 80%), the system may raise the urgency of transmitting the latest diagnostic report, even while offline, ensuring that once a remote connection is available, this high-risk status is communicated immediately, ahead of lower-priority or older transactions.

For example, a system might calculate the probability of failure using current sensor readings for temperature (T), vibration (V), and voltage fluctuation ($\Delta V$), applying weighted factors to each: 0.5 for temperature, 0.3 for vibration, and 0.2 for voltage fluctuation. Suppose the latest readings are 85° C. (above a 80° C. limit or threshold), 5.0 mm/s vibration (above a 4.0 mm/s limit), and 3% voltage fluctuation (below a 5% limit), with corresponding individual risk probabilities of 0.9, 0.7, and 0.1. The overall failure probability may then be calculated as $(0.5\times0.9)+(0.3\times0.7)+(0.2\times0.1)=0.45+0.21+0.02=0.68$. Based on a predefined scale where 0.6-0.8 is classified as "High" urgency/risk for failure, the system may determine or assign this urgency level to the report, update the local transmission/processing schedule accordingly, and prioritize the report for immediate transmission when a remote network connection is restored. In some embodiments, updates to a schedule—determining the order in which data items are transmitted and/or processed by, for example, a controller—may be received from systems or devices such as sensors over a local network and/or generated by the transmitting device itself, for instance by the controller processing sensor data against predetermined system thresholds and identifying abnormal readings.

Some embodiments may adjust urgency levels, for example, after they have been determined and before the relevant request is sent and/or processed. For example, if a temperature reading is above an 80° C. limit or threshold and there is no available remote access connection (e.g., in offline mode), the system may recalculate or modify the urgency level for transmitting other requests or reports, and/or constituent sensor readings, that have not yet been processed or transmitted over a remote access connection. For instance, upon receiving or detecting abnormal sensor readings while in offline mode, some embodiments may determine a "Low" urgency level for previously generated reports or data items—including only "normal" sensor readings, or readings below the thresholds for failure—and determine a "High" urgency level for the abnormal readings or reports including them. The reports/data items may be transmitted or processed according to the urgency levels and schedule (such that abnormal readings are transmitted/processed first)—e.g., once remote access connection becomes available. In this nonlimiting use case example, some embodiments may improve (hardware) resource maintenance technologies by assigning high urgency to the transmission or processing of information indicating a potential hardware failure, allowing to take corrective action in due course (such as for example automatically shutting down relevant computer systems by the local device, and allowing hardware components to cool down).

Additional or alternative operations, workflows, effectiveness metrics, and the like, may be used in different embodiments.

Similar processes may be carried out for different example use cases, such as, e.g., autonomous drone fleets or data center power systems, where a plurality of devices may exchange status and schedule updates locally, adjusting urgency and execution timing based on system metrics and link reliability, then dispatch the revised queue over a remote network when possible.

Some additional nonlimiting example transaction requests may include, for example, an image to be analyzed (e.g., as part of a medical procedure such as cancer detection). Some embodiments may send or transmit the request online when an internet connection is available. Receiving a response to the request by the corresponding server or endpoint may indicate that online access is available without disruptions, and no further action may be required.

If an online connection is unavailable, a local or offline decision may be made regarding whether a temporary or tentative, offline response may be provided locally (at least until online connection is available again). If it is determined that an offline response cannot be provided, some embodiments may reject the request or label the request as rejected. If an offline response is feasible, then the offline response may be provided, and the request may be stored in a local database and then transmitted or transferred to an online/remote database when network connection is available. Referring to the nonlimiting industrial automation system example provided herein, an offline response that may be provided locally may include, e.g., an activation of a cooling system by the controller when a temperature sensor reading exceeds a critical threshold, even without a remote network connection to the diagnostic server. Other examples of offline responses may include, for example, tentatively approving identification, credit card payments, and similar transactions prior to receiving confirmation from an online database or computer system (where "tentative" approval may refer to accepting or not rejecting the payment or associated transaction before it is validated, with the possibility that it may later be reversed or disapproved upon validation). Additional offline responses or approval protocols may be used in different embodiments.

At any point before online processing, an urgency schedule (which may indicate the urgency and/or potential penalties for delayed responses for different requests) may be updated. An update decision may be made locally and may be executed either on-site or in the cloud (e.g., determining the order of execution, handling, or processing transactions and related computerized operations by the online system, independently or in addition to the order of processing/transmission by the local system).

In some embodiments, a request may be received, issued, or initiated by a local device, for example to verify certain information online, which could have various consequences. For instance, the request might pertain to determining whether a transaction is approved, if an image contains cancer, or if a blood test is positive for a specific condition. However, in certain scenarios, access to the online system may not be available, or the online system may be too busy to provide a timely response. In some embodiments, a local protocol or procedure may be executed to decide whether to proceed as if the online result is known. This local decision-making process may allow for continuity in operations despite the lack of immediate online verification. Meanwhile, the request may be stored locally until it can be processed online. The requests may have urgency levels or properties associated with them, which may influence the priority and timing of their processing, e.g., when network connection is restored.

In some embodiments, an urgency level of a request may be modified as long as the request has not yet been sent or transmitted online. These levels may be adjusted, for example, based on new information received in offline mode and/or prior to the transmission of the request.

In one nonlimiting example, a patient may have an X-ray image taken, which is intended to be uploaded to a medical infrastructure server or cloud for further analysis (which may be referred to as the "first test" in the context of this nonlimiting example). However, there may be instances where the cloud is not available, and/or the processing in the cloud is slow. This could occur due to various reasons, such as network issues or high demand on cloud resources, which may or may not be automated. (For the purpose of this nonlimiting example, one may assume that the cloud is not available.) In some embodiments, the image may be stored in a local database, and may be uploaded for analysis (for completing the first test) once communication with the cloud is reestablished. There may be an a-priori probability, denoted as Ps, that the image for a particular individual does not indicate any medical issues or problems requiring urgent attention.

Some embodiments may include calculating an effectiveness metric for the one or more data items, where the transmitting or preventing of the transmission is performed based on the calculated effectiveness metric.

For example, in some cases, it may be necessary to decide whether to proceed as if the image indicates a medical problem (or does not indicate a problem) before the image has been analyzed, or before the first test has been completed. This involves continuing operations as if the result of the image analysis or first test is already known, even though it has not yet been completed. When the image is stored locally or sent online, an urgency level or label may be associated with or attached to it. The decision on urgency scheduling and/or transmission may be made in offline mode, for example based on calculating various metrics or scores (also referred to herein as "effectiveness metrics")—considering various factors such as, e.g., the probability of certain scenarios/issues (e.g., the probability that the X-ray image is indicative or a severe illness), the availability of resources, the potential consequences of delayed analysis, and the like. Urgency scheduling, or the determining of urgency levels, may have to be updated upon receiving new information (e.g., new symptoms by the patient).

In some embodiments, various cases may arise that require specific decision-making processes. For example, in one case or situation, if the result of an exam such as, e.g., the first test is negative (or positive), a subsequent second test may be necessary (for example if an X-ray image includes an indication for a severe illness, subsequent blood tests may have to be taken). It may be desirable to schedule this additional or second test for a specific time (e.g., as urgently as possible), such as, e.g., Thursday at 5 PM.

The cost or loss, or the effectiveness metric value associated with conducting this second test is denoted as Ct, while the cost of any delay is represented as D. The second test may not be conducted if an initial result or first test is positive (or negative)—e.g., if it is concluded that the image does not include an indication of a severe illness. In some embodiments, the cost or effectiveness metric value of performing the second test without any delay may be Ct (as D=0). The cost or effectiveness metric value of waiting to perform the second test only after receiving the initial result, or the results of the first test may be calculated as D+Ct* (1−Ps), where Ps represents the probability that the second test is needed or necessary. If the effectiveness metric value Ct is less than the combined effectiveness metric value of D+Ct*(1−Ps), some embodiments may proceed with scheduling the second test (or, e.g., updating a schedule for a request to schedule that test) even without knowing the result of the first. This scenario may be considered akin to processing or authorizing a transaction without prior confirmation.

There may be inherent value in knowing the result of the first test before a specified time, such as Thursday at 5:00 PM, as this knowledge may determine the necessity of a second test. This consideration may influence the priority assigned to evaluating the image, or for the uploading of the image to the cloud for completing the analysis as part of the first test.

A nonlimiting, use-case-agnostic effectiveness formula, based on which priority or urgency levels may be determined, is provided in Eq. 1:

$$E(t) = V*Ps - C*(1-Ps) \tag{Eq. 1}$$

Where E is the effectiveness metric value measuring whether processing at a given point in time t is beneficial, V is an estimate of a potential value of processing a request or data item at time t, C is an estimate of a potential cost of processing a request or data item at time t, and Ps is the probability that the estimate V is correct. The specific values or V, C, and Ps may depend on the specific use case at hand. For instance, a nonlimiting case where Ps represents a probability of successful transmission and/or online processing is further provided herein.

In a nonlimiting use case example involving abnormal sensor readings from a monitoring station, both V and C may be expressed in standardized operational cost units (e.g., CPU cycles, joules of energy, or operational impact scores). For example: V=50 (representing the estimated operational cost savings from proactively addressing a detected anomaly, such as avoiding equipment failure due to hazardous conditions), C=20 (representing the immediate operational cost of processing the alert and initiating a response action), and Ps=0.75 (indicating a 75% probability that the anomaly is a true positive). Then, where t is the time of measuring or receiving the abnormal sensor readings by a local device: E(t)=50×0.75−20×(1-0.75)=37.5−5=32.5. A positive E(t) value may indicate that, given the current assumptions, processing the data item at time t is expected to be beneficial or effective.

In some embodiments, effectiveness values may be normalized, scaled or weighted—e.g., by scaling factors or coefficients c1, c2, . . . cn for a plurality of calculated effectiveness value E1, E2, . . . . En that may be calculated for a corresponding plurality of requests or data items to be processed or transmitted. Scaling factors may, in some embodiments, reflect contextual parameters or constraints associated with each data item. For instance, a scaling factor may account for factors such as the criticality of a data source, reliability of the measurement, available processing capacity, and the like. A priority or urgency levels may be determined for each of the requests or data items, for example, according to threshold values or ranges.

For instance, consider a nonlimiting use case example of three data items with calculated effectiveness values: $E1=40$, $E2=70$, $E3=55$ and corresponding scaling factors: $c1=1.0$ (e.g., baseline priority for a routine status message), $c2=0.8$ (e.g., lower scaling due to the data source being less reliable or the event being less time-critical), $c3=1.2$ (e.g., elevated scaling due to the data source being from a high-risk zone or tied to a critical system). The scaled effectiveness values may then be: $E1'=40\times1.0=40$, $E2'=70\times0.8=56$, $E3'=55\times1.2=66$. These scaled values may then be compared against predefined value ranges to assign priority levels, such as for example: High priority: $E'>60$, Medium priority: $45\leq E'<60$, Low priority: $E'<45$. This may result in: $E1'=40\rightarrow$Low priority, $E2'=56\rightarrow$Medium priority, $E3'=66\rightarrow$High priority. Some embodiments may adaptively prioritize data items (e.g., in offline mode) based on their raw effectiveness metric values and by incorporating contextual relevance or operational risk, ensuring that critical or high-impact events are processed with appropriate urgency.

Additional or alternative effectiveness formulas and use case examples may be used in different embodiments.

A nonlimiting use case example in which some embodiments may change priority or urgency levels locally (e.g., in offline mode, without a connection to a remote access network): Assume a hospital system (including, e.g., local devices and network) connected over a remote access network to a physically separate, remote server or facility in which medical images are analyzed or evaluated. According to some embodiments, when the hospital sends an image for evaluation, it may send it with one of three priorities, e.g.: High (should be evaluated within half a day), Regular (should be evaluated within a day or two) and Low (should be evaluated within less than a week). An image was taken on Monday and is needed for a doctor's appointment scheduled for the subsequent Thursday. When the image is taken, it may be associated with an expiry date of 3 days from the taking of the image (according to the date of the appointment where their analysis is needed) and may be assigned a Regular priority (e.g., by default). However, assume the image was not sent due to communication issues, and to the remote access network being unavailable. On Wednesday, given the image has not been sent—and based on the fact only 1 day is left until the image/request becomes expired—some embodiments may locally change or update the image's urgency level from Regular to High, so upon restoration of communication it may be sent with high priority (such that analysis results may be available before Thursday's appointment). In case no communication is available on Friday, some embodiments may further change or update the image's urgency level to Low, e.g., given that the Thursday expiry date has passed and that next available doctor's appointment is in two weeks (a new expiry date may be set to that of the next available appointment). Given that on Saturday communication was re-established, some embodiments may send the image to analysis with a Low priority or urgency level (similarly, given that communication is established earlier, say on Wednesday and prior to Thursday when they are needed, the image may be sent with a High urgency level). The image, created locally, may be assigned different priorities or urgency levels locally before it is sent or transmitted over a remote access network to the remote analysis facility.

To illustrate a similar concept, a nonlimiting example of a financial network transaction may be used. In some embodiments, an effectiveness metric includes a probability of successful transmission.

In this case, a transaction may be initiated while communication is offline, and a decision on whether to approve or deny the transaction (e.g., while still in offline mode) may be made by determining or evaluating a probability for subsequent online approval, or for a successful transmission of a valid transaction request to a remote server or payment processor. Assume the transaction amount is represented as Ma, and the probability that the transaction will be approved online (or that the transmission will be unsuccessful and the transaction invalid) is Pna. Transaction probabilities, as well as the value of a successful transaction or transmission, may be used as part of an example an effectiveness metric. The value of a successful transaction/transmission is denoted as Mg. If the decision of approving or denying the transaction is made within a certain time frame, T, it may be possible to reverse the transaction (which may include, e.g., changing its outcome—approve instead of deny, deleting records of previous approval/denial, and the like). The timing of approval may not be critical in some cases.

In this nonlimiting example, possible outcomes/scenarios include:

1. The transaction is approved offline, and it is subsequently approved online, resulting in a value of Mg. The probability of this outcome is Pna.
2. The transaction is approved offline, but it is later determined to be invalid (as part of online processing), and it is not identified in time, leading to a subsequent online rejection with a value of $-$Ma. The probability of this scenario is $(1-$Pna$)$ multiplied by the probability of not identifying the issue within time period or time frame T.
3. The transaction is approved offline, found to be invalid within time period T (while still in offline mode), and subsequently reversed, resulting in a net value of 0. The probability of this outcome is $(1-$Pna$)$ multiplied by the probability of identifying the issue within time period T.
4. The transaction is not approved, or is declined offline, resulting in a value of zero.

In some embodiments, a decision to approve/deny the transaction may be based on an effectiveness metric including a weighted combinations of the probabilities of outcomes/scenarios 1, 2, and 3, and on whether this combination results in a value greater than zero.

In some embodiments, specific values of Pna and/or Ma may be determined or calculated based on historical data (such as for example using average/standard deviation of network outage times) or on a subset of such data (such as for example average network outage time on weekends, average network outage time on weekdays, average time of processing a request given the specific error message received given an unsuccessful processing attempt, and the like). Example use case or application specific rules may also be applied, such as for example a probability for a specific processing results (e.g., a probability that an analysis of a medical image would result in a positive diagnosis, for example based on a specific patient's medical history and data—or a probability that a transaction will be later approved given store and customer history as documented in data available to the local device.

In some embodiments, a tardiness schedule may be used or employed to reflect the transmission effectiveness, gain or benefit of having the online system process or analyze the transaction within a specific time frame. For example, for two points in time, t1 and t2, where t1 is earlier than t2, the benefit of analyzing and processing a transaction by t1 may be greater than or equal to the benefit doing so by t2.

In some embodiments, an effectiveness metric value associated with a data item may be used to determine or adjust the schedule, such that data items with higher metric values—indicating greater expected benefit or likelihood of successful, timely processing—are prioritized for earlier transmission. The schedule may be dynamically updated by comparing transmission effectiveness values and reordering the transmission queue to optimize overall system performance or resource use.

For example, assume data item A has a probability of transmission success of 0.95 and a processing benefit score of 0.9, while data item B has a probability of transmission success of 0.6 and a processing benefit score of 0.85. Nonlimiting example effectiveness metric values for each item may be calculated, e.g., as the product of these two values. For data item A, the effectiveness would be $0.95 \times 0.9 = 0.855$, and for data item B, it would be $0.6 \times 0.85 = 0.51$. Based on these values, data item A may be prioritized for earlier transmission in an updated schedule (associating, e.g., item A with a "high" urgency level, and item B with a "medium" urgency level). Additional or alternative protocols for determining an update to a schedule based on effectiveness metric values may be used in different embodiments of the invention.

Once transactions are transmitted or uploaded to the cloud (namely, when the system is in offline mode), a decision may be made regarding the order in which transactions are processed. Each transaction may have, may include, or may be associated with a tardiness schedule and estimated processing time. The scheduling of transaction processing may be optimized for improved efficiency of available cloud resources. This optimization may be global, meaning that the scheduling of the processing of each specific transaction may not be merely a simple scheduling task but rather be based on a cost function that considers whether other jobs have already been completed and/or whether other transactions have already been processed.

FIG. 5 shows an example process for storing data items and changing priorities in local storage according to some embodiments of the invention.

Some embodiments may store a data item or transaction request in a local database under various conditions. For instance, data item or transaction request (element 502) may be stored in local database (element 504) if (1) no communication with a remote system is available (element 506), and (2) if a subsequent response or event would render online verification unnecessary.

In some embodiments, a request may not be transmitted to a remote server even when communication becomes available. For example, consider a nonlimiting transaction request to automatically grant an individual access a building (e.g., by automatically unlocking an electronically operated door). In such an example use case, the individual may be denied access, and may subsequently leave the area. In such a case, transmitting the access request to the server after the individual has left may no longer serve any functional purpose. This nonlimiting example illustrates a class of scenarios in which the urgency or relevance of a request may be context-dependent and may, for example, change over time. In one example, the request may be considered relevant while the individual remains in proximity to the access point, reflecting a high-priority state. However, once the individual departs, some embodiments may lower the urgency level or discard the request, which may become entirely obsolete.

In some embodiments, online verification may be unnecessary if the system locally denies a transaction request (such as, e.g., declines access to a building or rejects a payment) and such a decision is final or irreversible. In such a case, there may be no benefit in subsequent remote processing. For example, in nonlimiting use cases where the request and/or a subsequent action is denied, such as for example by not initiating or executing further operations (e.g., not automatically opening a door, not approving payment details)—the system may determine that further online interaction is unnecessary, and the decision and response to the request may be handled entirely by the local system.

Some embodiments may, for example, periodically (or in response to various inputs or events), evaluate conditions that affect the handling of a given data item or request. For example: (1) some embodiments may periodically check (e.g., once in a time period P, e.g., P=15 seconds; element 508) if remote access network connectivity is available (element 510). If so, the system may send the request online (element 512) to initiate communication with the remote server (e.g., to send or transmit the request to the remote server, to receive a response from the remote server, and the like), otherwise, the system may process the request locally or do nothing; (2) if an event occurs that alters the priority of the request (see nonlimiting examples herein) the system may discard the request or lower its priority; and (3) if a certain amount of time has elapsed since the request was received and stored locally, some embodiments may change the urgency or relevance of the request, potentially requiring a faster response to remain meaningful or, conversely, indicating diminished importance.

Some embodiments may dynamically adjust the priority or urgency level of a data item or transaction request in the local database (element 518) based on locally available information and events. For example, time may cause the system to change priority or urgency levels (element 514): the system may, e.g., lower the priority of a pending request if a time interval exceeding a threshold value T has elapsed since the original request timestamp, or since the request was received and stored in the local database. Additionally or alternatively, data and/or inputs describing events that may cause priority changes (element 516)—such as for example location or sensor data received from an auxiliary device—may be used to determine user proximity to the relevant site (e.g., a building for which access is requested). If such data indicates that the user is no longer near the location, the system may deprioritize or discard the request.

Nonlimiting pseudocode examples describing algorithms for local processing of a transaction request and for changing priority or urgency levels locally are provided in Table 6:

```
receive transaction_request
if Online_Connection available
send transaction_request online
if Online_Connection is not available
        if remote response/reply is to deny transaction_request
        Deny transaction_request
else store transaction_request in local DB and respond locally
every short amount of time:
        if Online_Connection is available
        send online
        else if conditions [X,Y,...] for transaction_request are fulfilled (e.g., X=a time
period of 15 seconds has passed since transaction_request was received locally)
                change priority in the local DB.
##Priority change (transaction):
receive existing priority from local DB
calculate/reevaluate priority based on conditions [X,Y,...] and/or additional parameters.
if calculated priority is different from existing priority
                change existing to current
        else do nothing.
```

Additional or alternative operations may be executed in different embodiments.

FIG. 6 is a flowchart of an example process for offline processing of network transmissions according to some embodiments of the invention.

In operation 610, some embodiments may receive, without access to a communication network (e.g., in offline mode), an update to a schedule of transmitting data items over the communication network (which may be used to transmit the data items once back in online mode, or once network connection becomes available/stable). In some embodiments, the schedule may be determined based on a plurality of urgency levels, where, e.g., each data item to be transmitted is associated or linked with a corresponding urgency level. Some embodiments may transmit (e.g., in online mode, or once network connection becomes available/stable, e.g., once the data transfer rate for the network is above a threshold), or prevent transmission of one or more of the data items over the communication network based on the received update (operation 620). In some embodiments, the update to the schedule and/or the transmitting or preventing of the transmission of data items may be based on calculated effectiveness metric values, which may include probabilities of successful transmission. Additional or alternative operations may be executed in different embodiments.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of offline processing of network transmissions, the method comprising, using a computer processor:
   receiving, without access to a communication network, an update to a schedule of transmitting data items over the communication network, wherein one or more of the data items is associated with an urgency level, wherein one or more of the data items requires a response from a remote server, the remote server connected to a local device comprising the computer processor over the communication network, and wherein the schedule is determined based on a plurality of urgency levels including the urgency level;
   generating, by the local device, a tentative response to a request;
   transmitting, or preventing transmission of, one or more of the data items over the communication network based on the received update; and
   replacing the tentative response with the response from the remote server, the replacing based on a determination that the tentative response does not match the response from the remote server.

2. The method of claim 1, wherein data items having a higher urgency level are transmitted before data items having a lower urgency level.

3. The method of claim 1, wherein the update and one or more of the data items are received when the processor does not have access to the communication network.

4. The method of claim 3, comprising determining that the processor does not have access to the communication network based on a data transfer rate for the communication network below a predetermined threshold.

5. The method of claim 1, comprising calculating an effectiveness metric for the one or more data items, wherein the transmitting or preventing of the transmission is performed based on the calculated effectiveness metric.

6. The method of claim 5, wherein the effectiveness metric comprises a probability of successful transmission.

7. The method of claim 1, wherein the urgency level is determined based on the tentative response generated by the local device.

8. A system for offline processing of network transmissions, the system comprising:

a memory; and a processor configured to:

receive, without access to a communication network, an update to a schedule of transmitting data items over the communication network, wherein one or more of the data items is associated with an urgency level, wherein one or more of the data items requires a response from a remote server, the remote server connected to a local device comprising the processor over the communication network, and wherein the schedule is determined based on a plurality of urgency levels including the urgency level;

generate, by the local device, a tentative response to a request;

transmit, or prevent transmission of, one or more of the data items over the communication network based on the received update; and replace the tentative response with the response from the remote server, the replacing based on a determination that the tentative response does not match the response from the remote server.

9. The system of claim 8, wherein data items having a higher urgency level are transmitted before data items having a lower urgency level.

10. The system of claim 8, wherein the update and one or more of the data items are received when the processor does not have access to the communication network.

11. The system of claim 10, wherein the processor is to determine that the processor does not have access to the communication network based on a data transfer rate for the communication network below a predetermined threshold.

12. The system of claim 8, wherein the processor is to calculate an effectiveness metric for the one or more data items, wherein the transmitting or preventing of the transmission is performed based on the calculated effectiveness metric.

13. The system of claim 12, wherein the effectiveness metric comprises a probability of successful transmission.

14. The system of claim 8, wherein the urgency level is determined based on the tentative response generated by the local device.

15. A method of processing network communications, the method comprising, using a processor:

receiving, without access to a remote access network, an adjustment to a schedule of sending network requests over the remote access network, wherein one or more of the network requests is associated with priority level, wherein one or more of the network requests requires a response from a server, the server connected to a computer device comprising the computer processor over the remote access network, and wherein the schedule is determined based on a plurality of priority levels including the priority level;

generating, by the computer device, a tentative response to a request;

sending, or preventing sending of, one or more of the network requests over the remote access network based on the received adjustment; and replacing the tentative response with the response from the server, the replacing based on a determination that the tentative response does not match the response from the server.

* * * * *